(12) United States Patent
Thomas et al.

(10) Patent No.: US 6,429,974 B1
(45) Date of Patent: Aug. 6, 2002

(54) ADD-DROP MULTIPLEXER

(75) Inventors: Mark Thomas; Michael Munroe, both of Petaluma, CA (US)

(73) Assignee: Mahi Networks, Petaluma, CA (US)

( * ) Notice: Subject to any disclaimer, the term of this patent is extended or adjusted under 35 U.S.C. 154(b) by 0 days.

(21) Appl. No.: 09/854,100

(22) Filed: May 11, 2001

Related U.S. Application Data

(60) Provisional application No. 60/203,985, filed on May 12, 2000.

(51) Int. Cl.⁷ .......................... G02B 27/10; G02B 6/26; H04J 14/02
(52) U.S. Cl. ...................... 359/618; 359/125; 359/127; 359/130; 359/111; 359/237; 359/124; 385/16; 385/18; 385/24; 385/37
(58) Field of Search ............................... 359/109, 111, 359/115, 117, 123, 124, 125, 127, 128, 130, 140, 237, 278, 618; 385/3, 14, 16, 17, 18, 24, 37; 356/519

(56) References Cited

U.S. PATENT DOCUMENTS

| | | | |
|---|---|---|---|
| 6,084,694 A | * 7/2000 | Milton et al. | 359/124 |
| 6,154,585 A | * 11/2000 | Copner et al. | 385/16 |
| 6,208,441 B1 | * 3/2001 | Jones et al. | 359/127 |
| 6,243,179 B1 | * 6/2001 | Thompson et al. | 359/130 |
| 6,256,433 B1 | * 7/2001 | Luo et al. | 385/24 |
| 6,310,690 B1 | * 10/2001 | Cao et al. | 356/519 |
| 6,348,984 B1 | * 2/2002 | Mizrahi | 359/124 |

* cited by examiner

Primary Examiner—Loha Ben
(74) Attorney, Agent, or Firm—Blakely Sokoloff Taylor & Zafman, LLP

(57) ABSTRACT

Methods and apparatus are contemplated for dropping and adding a user-chosen wavelength sub-band in a band of wavelengths. Methods and apparatus are contemplated for separating and dropping individual wavelengths from a wavelength sub-band, and adding the individual wavelengths back to the wavelength sub-band. An OADM is contemplated that combines a wide-band OADM stage and a narrow-band OADM stage.

1 Claim, 15 Drawing Sheets

ADD-DROP MULTIPLEXER

This application claims priority from U.S. Provisional Application No. 60/203,985 filed May 12, 2000.

FIELD OF THE INVENTION

The invention relates to optical networking.

BACKGROUND OF THE INVENTION

An optical add drop multiplexer (OADM) is a device used to extract a set of optical signals (also called "wavelengths" herein) from a wavelength division multiplexed (WDM) signal input to the OADM, and to subsequently reinsert the extracted set of wavelengths output by the OADM. FIG. 1 (prior art) shows a block diagram of an OADM 100. A WDM optical signal, (also called "wavelength band" herein) comprises a plurality of wavelengths. One of the wavelengths, $\lambda_2$, is extracted (also called "dropped" herein) from an input line side 102 via a de-multiplexer 104, and then subsequently reinserted (also called "added" herein) onto an output line side 108 via a multiplexer 106. The purpose of adding and dropping wavelength(s) in this manner is to obtain information encoded on the dropped wavelength (in FIG. 1, the dropped wavelength is $\lambda_2$); one may also transmit new information on dropped wavelengths. In most instances the carrier wavelength of the dropped wavelength is the same as carrier wavelength of the added wavelength.

It is well recognized that a preferred implementation of an OADM employs tunable de-multiplexers and multiplexers, enabling choice in the wavelength(s) to be dropped/added. However, until tunable filter technology is mature, OADMs will continue to be constructed using fixed de-multiplexers and fixed multiplexers, along with switches to select the wavelength(s) to be dropped.

There has been an evolution of OADM products in recent years. The first generation OADMs, as in FIG. 1, were not configurable, i.e., the determination of which wavelengths are dropped and added was set at the time of manufacture of the OADM. Second generation OADMs are configurable, but have a number of limitations. FIG. 2 (prior art) shows a simple three-wavelength system utilizing a second generation OADM 200. The second generation OADM 200 de-multiplexes all the wavelengths of interest via a de-multiplexer 204, and passes each wavelength through a respective 2×2 switch 206 that is controllable by the user. The 2×2 switch 206 has two settings: in one setting the 2×2 switch 206 allows the demultiplexed wavelength to pass through with no further processing, via an optical waveguide 212, while in the other setting the 2×2 switch 206 connects the demultiplexed wavelength, e.g., $\lambda_1$, to a drop optical waveguide 208, and simultaneously connects an add optical waveguide 210 to the optical waveguide 212 that is attached to a multiplexer 214, which multiplexer multiplexes all wavelengths input to the multiplexer, for example, wavelengths $\lambda_1$, $\lambda_2$, $\lambda_3$, producing a multiplexed signal to an output via an egress line 216.

The system depicted in FIG. 2 has a number of disadvantages:

(1) Poor optical performance: Due to the filtering characteristics of each successive OADM, a series of OADMs that are concatenated typically results in channel narrowing.

(2) Poor network performance during upgrade or provisioning activities: Expanding the number of wavelengths in the system and/or expanding or changing the number of wavelengths added/dropped at a node typically requires shutting the system down for modification.

(3) High cost. For a system with a large number of wavelengths, it is costly to de-mulitplex, switch, and multiplex all wavelengths.

(4) Lack of flexibility. To avoid the high cost incurred as explained above, this type of implementation forces the user to pick a subset of wavelengths, thereby having reduced flexibility in add/drop capabilities.

(5) Inventory. Reducing the wavelength set addressed by any one OADM, as discussed in (4), requires the operator to stock a number of different types of OADM units (also called "modules" herein), leading to excessive inventory management.

What is needed is an OADM that overcomes the drawbacks enumerated above.

SUMMARY OF THE INVENTION

Methods and apparatus are contemplated for dropping and adding a user-chosen wavelength sub-band in a band of wavelengths. Methods and apparatus are contemplated for separating and dropping individual wavelengths from a wavelength sub-band, and adding the individual wavelengths back to the wavelength sub-band. An OADM is contemplated that combines a wide-band OADM stage and a narrow-band OADM stage.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Methods and apparatus for an improved optical add/drop multiplexer are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearance of the phrase "in one embodiment" in various places in the specification does not necessarily refer to the same embodiment.

Figure 3:
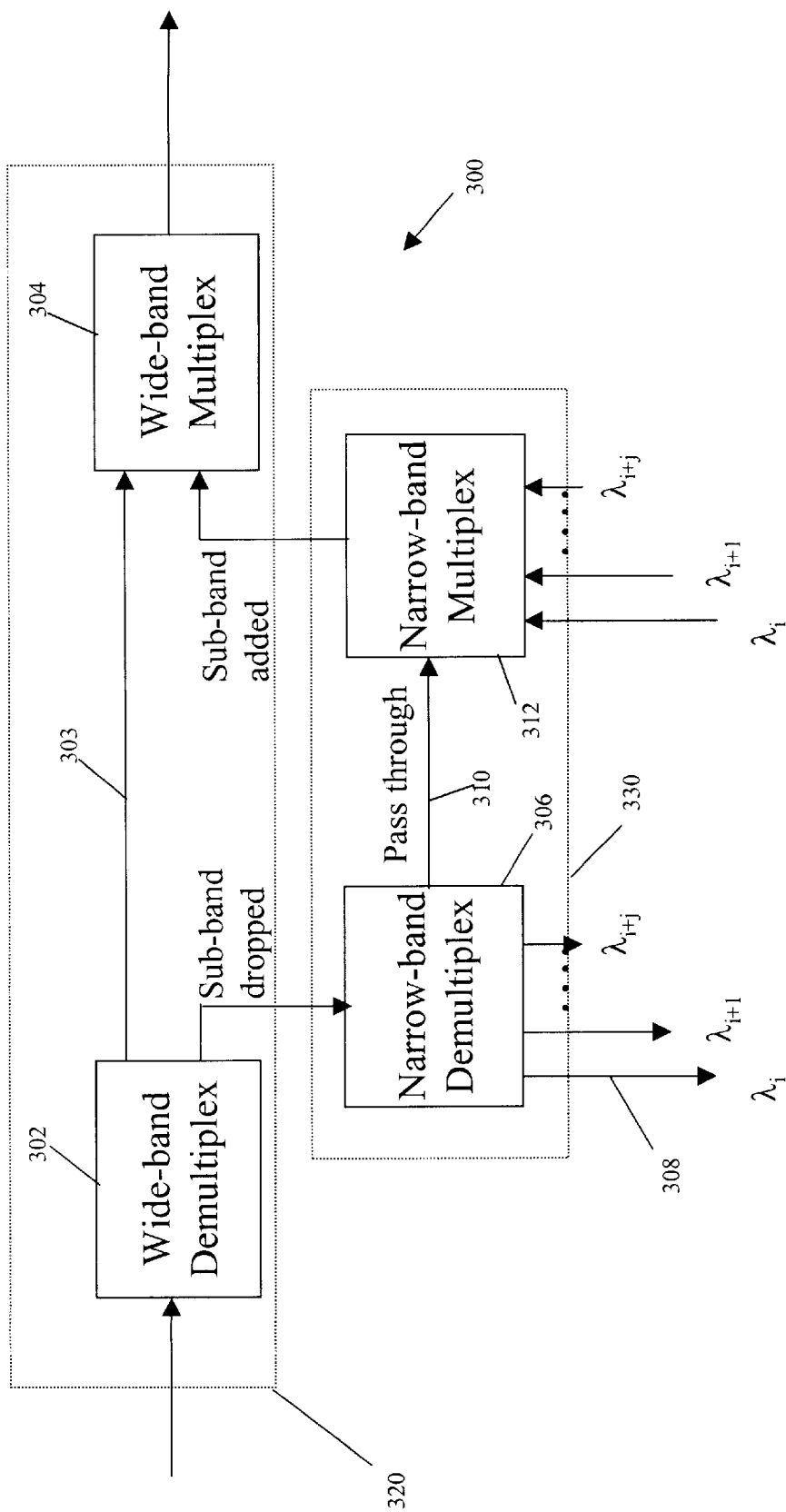
FIG. 3 shows a two-stage OADM, according to an embodiment of the invention.

An embodiment of the invention based on a multi-stage approach comprising a wide band stage OADM 320 (also called "wide-band OADM" herein) and a narrow-band stage OADM 330 (also called "narrow-band OADM" herein), is illustrated by a block diagram as shown in FIG. 3. The wide-band OADM 320 comprises a wide-band de-multiplexer 302 and a wide-band multiplexer 304. In the first stage, the wide-band de-multiplexer 302 separates out a sub-band from the incoming band of wavelengths, sending the sub-band complement, i.e., the entire band less the dropped sub-band, to the wide-band multiplexer 304 via an express path (also called a "pass-through path" herein) 303. For example, if the band of interest is the C-band of 1530 to 1560 nanometers (nm), or approximately $1.92 \times 10^5$ to $1.96 \times 10^5$ gigahertz (GHz), and such band comprises a plurality of 400 GHz sub-bands, a sub-band complement is the C-band minus a particular 400 GHz sub-band.

The dropped sub-band proceeds to the narrow-band OADM 330 (also called "drop/add station" herein), where at least some portion of the dropped sub-band is separated, using a narrow band de-multiplexer 306, into individual respective wavelengths $\lambda_i, \ldots \lambda_{i+j}$. One or more of these wavelengths is output onto respective output ports 308. An express path 310 expresses the remaining portion of the sub-band that has not been de-multiplexed, to a narrow-band multiplexer 312. The de-multiplexed wavelengths $\lambda_i, \ldots \lambda_{i+j}$ are each received by a respective receiver that decodes modulated information that is encoded on a respective modulated wavelength, and subsequently directs the respective modulated wavelength to the narrow-band multiplexer 312, which multiplexes the de-multiplexed wavelengths $\lambda_i, \ldots \lambda_{i+j}$. The returning multiplexed wavelengths $\lambda_i, \ldots \lambda_{i+j}$ are combined with the expressed portion of the sub-band by the narrow-band multiplexer 312, and are subsequently combined with the sub-band complement by the wide-band multiplexer 304. The wide-band multiplexer 304 outputs the wavelength band comprising all modulated wavelengths initially input into the wide-band de-multiplexer 320, although typically some wavelengths may be reduced in power from that of the incoming wavelength band, primarily as a result of OADM filtering characteristics.

Figure 1:
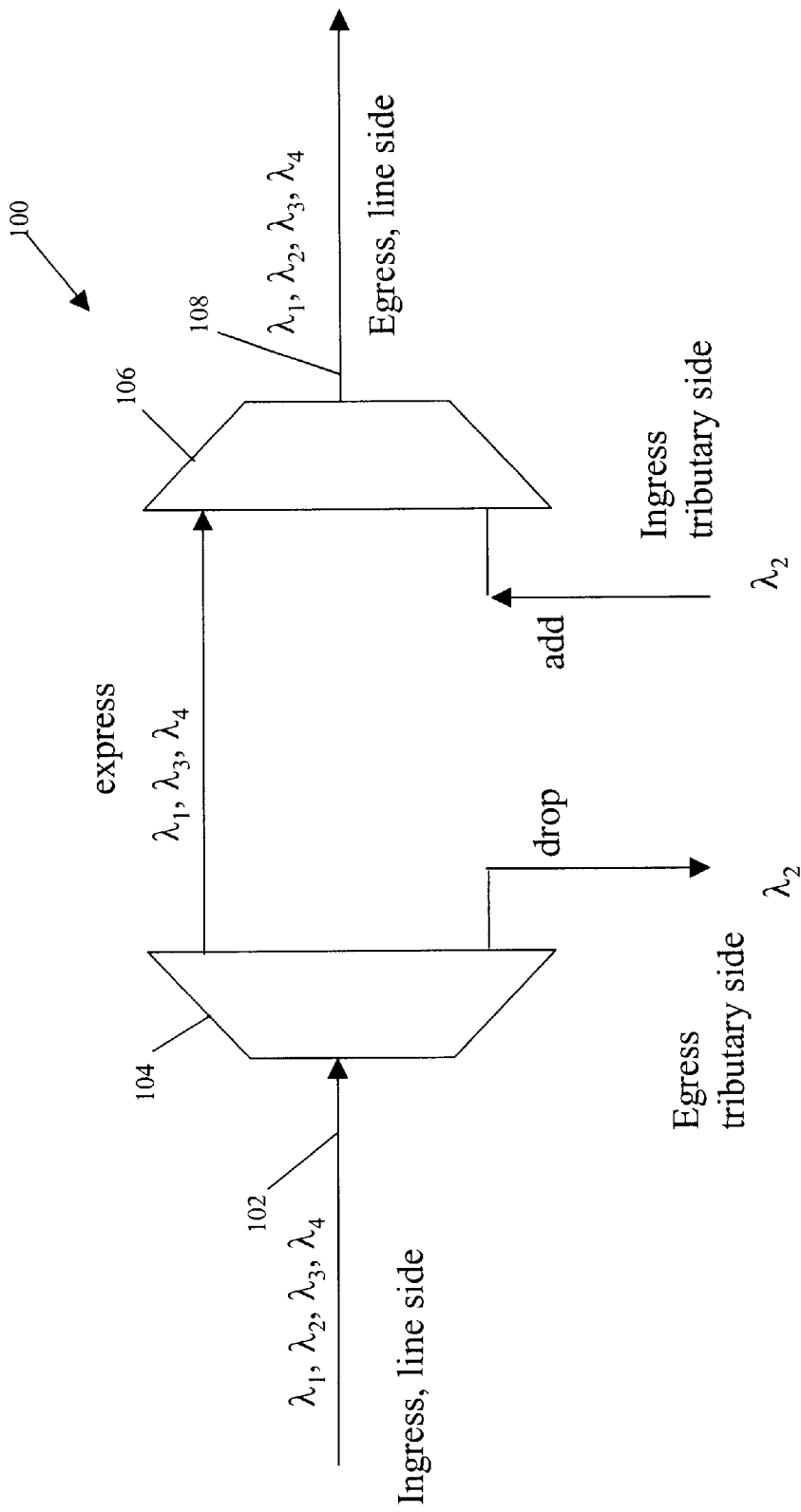
FIG. 1 (prior art) shows a first generation Optical Add Drop Multiplexer (OADM).
Figure 2:
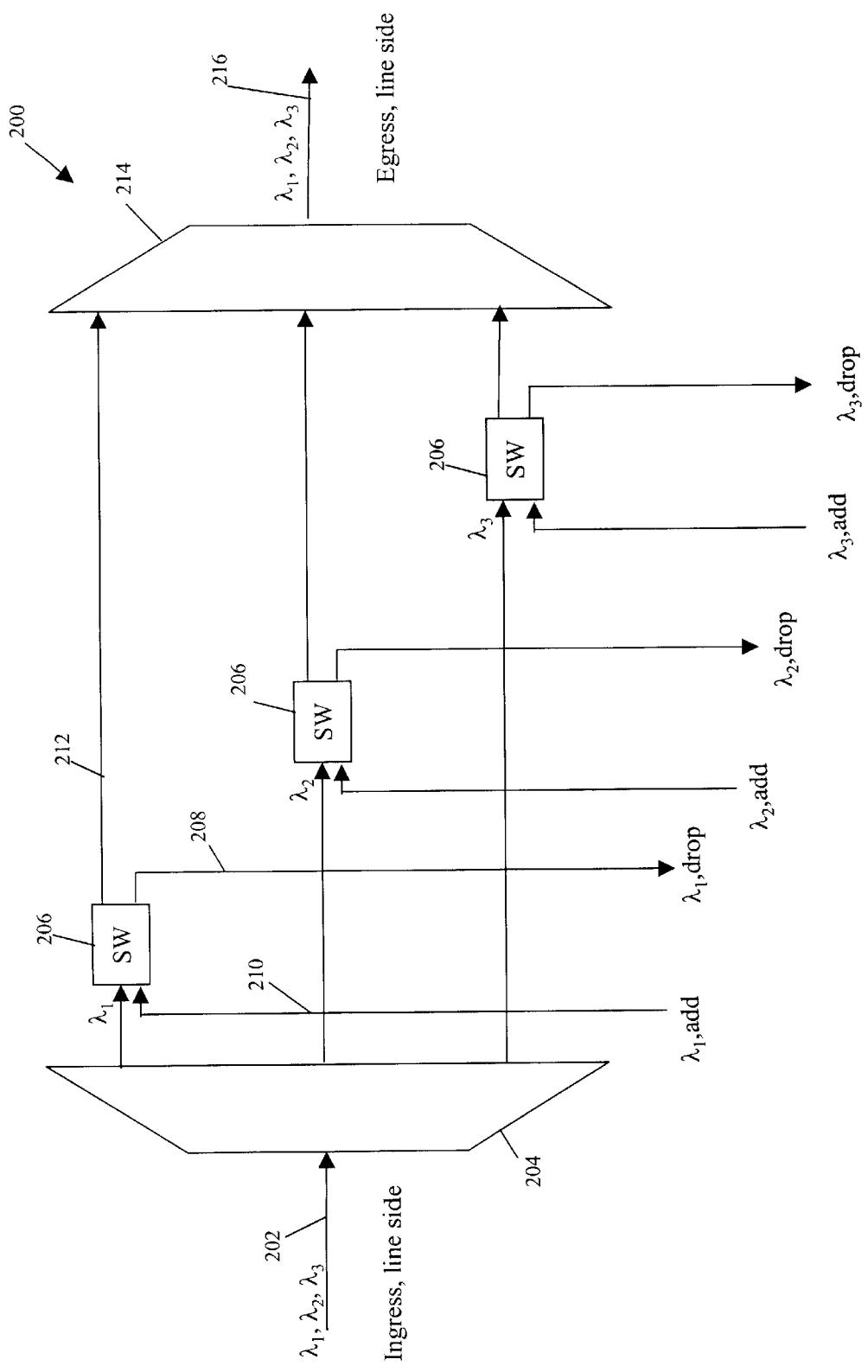
FIG. 2 (prior art) shows a second generation OADM.

A number of embodiments are presented for implementing both the wide-band stage of the OADM and the narrow-band stage of the OADM of FIG. 3, that realize improvements in flexibility, performance, inventory, service and cost over the second generation OADM described above and illustrated in FIG. 2. It is noted that the wide-band OADM embodiments and the narrow-band OADM embodiments may be interchanged.

Wide-band OADM Embodiments

Figure 4:
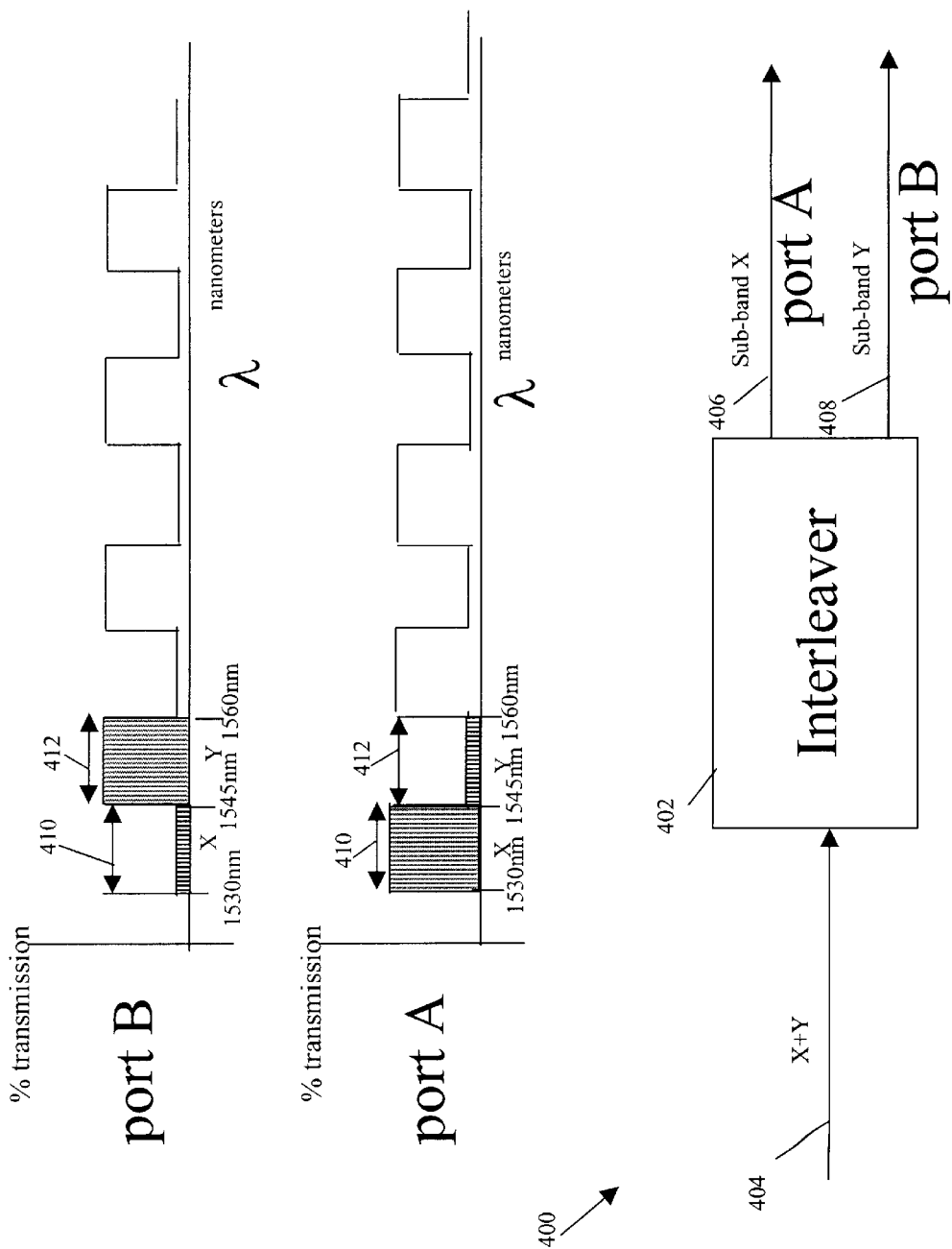
FIG. 4 shows a block diagram of an interleaver that may be used in a wide-band OADM application, according to an embodiment of the invention.

FIG. 4 shows the operation of an interleaver 402 in a wide band OADM application. A graph of the percentage transmission vs. wavelength indicates that, for the wide-band interleaver shown, port A transmits sub-band X comprising a bandwidth 410, while effectively blocking sub-band Y comprising a bandwidth 412; port B effectively blocks sub-band X while transmitting sub-band Y. Numerical values of wavelengths shown on the graphs in nanometers (nm) are for illustrative purposes only, and do not represent a limitation of any kind.

A wavelength band comprising wavelengths X+Y, that is input into the interleaver at an input 404, outputs sub-band X on an output port 406 and sub-band Y on an output port 408. In a typical wide-band OADM several interleavers are used, each of which passes a sub-band of a different wavelength span.

Figure 5:
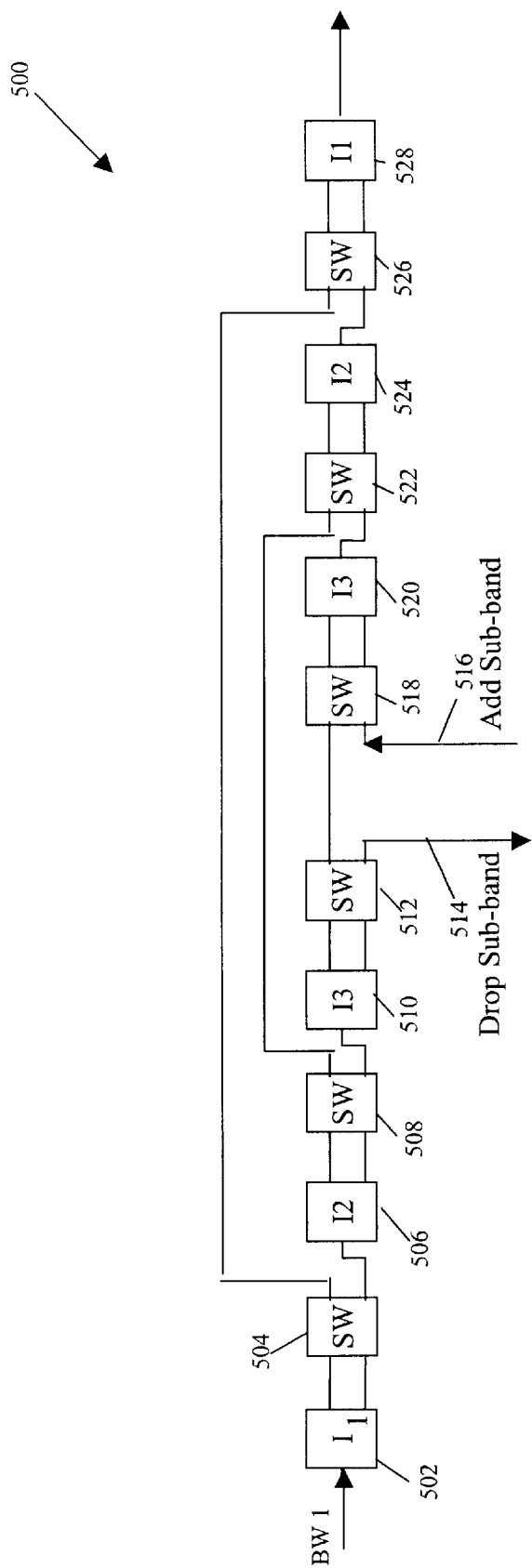
FIG. 5 shows a wide-band OADM, according to an embodiment of the invention.

FIG. 5 shows an embodiment 500 employing interleavers. An operating wavelength band, BW1, is 3200 GHz wide. An interleaver 502, level $I_1$, separates the wavelength band into two contiguous sub-bands of 1600 GHz; an interleaver 506, level $I_2$, further separates the 1600 GHz band into two contiguous sub-bands of 800 GHz; an interleaver 510, level $I_3$, finally separates the 800 GHz sub-band into two 400 GHz sub-bands. A switch 512 may drop one of the two 400 GHz sub-bands to a narrow-band OADM through a waveguide 514 and add the sub-band through a waveguide 516. A switch 518 is set so that the correct sub-band is input to the appropriate interleaver channel of interleaver 520. Switches 504, 508, 512, 518, 522, 526, along with interleavers 520, 524, 528, allow the system to be configured to add/drop any single 400 GHz sub-band within the 3200 GHz operating wavelength band BW1.

Figure 6:
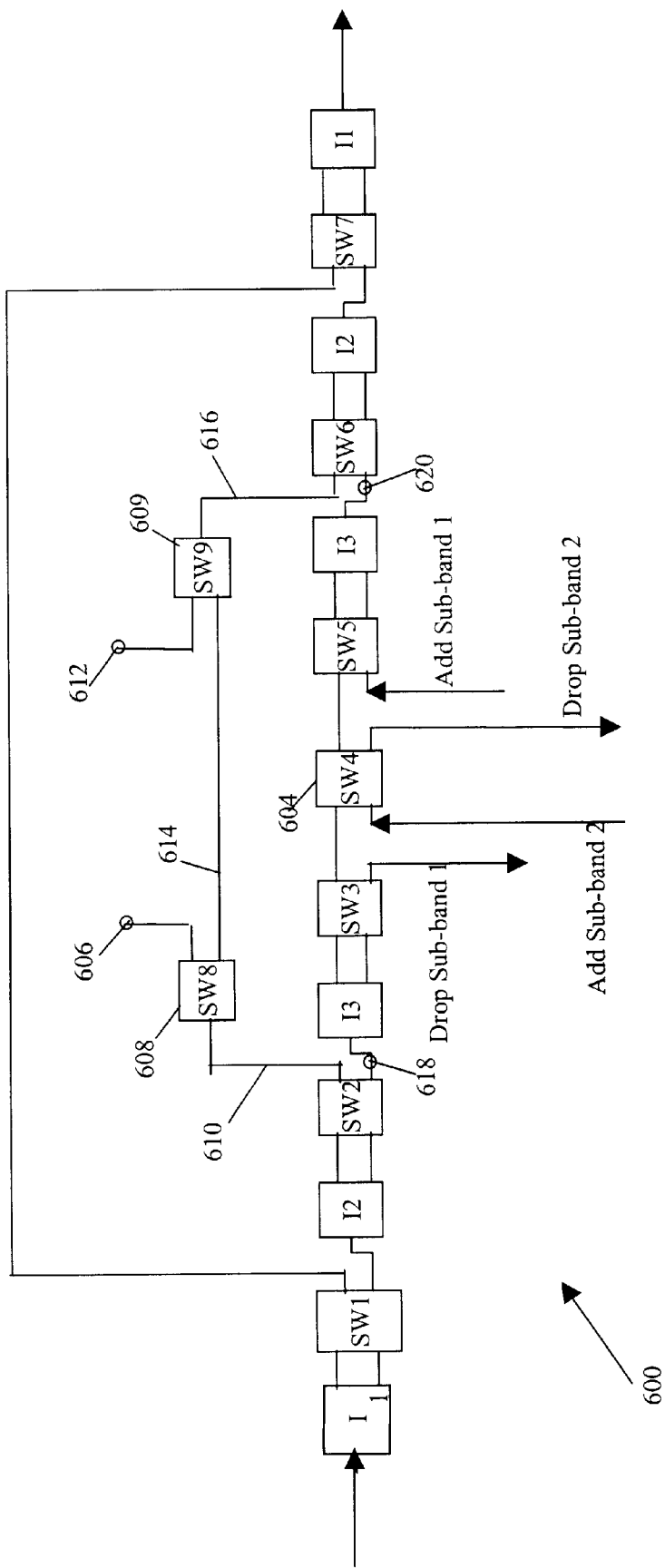
FIG. 6 shows a wide-band OADM, according to another embodiment of the invention.

Another embodiment that includes additional switches to allow the expansion of add/drop sub-bands is shown in FIG. 6. A switch 604 can initially be configured as a pass-through switch, allowing an entering signal to pass through unaffected. However, as the needs for bandwidth grow, an additional sub-band can be dropped and added, by configuring the switch 604 in its drop/add mode, allowing a sub-band 2 to be dropped and added. This represents a small, added expense over the implementation shown in FIG. 5. Further expansion can be added between terminals 606 and 612, to be connected through switches 608, 609. Note that until an upgrade is necessary, switches 08, 609 are configured to direct optical wavelengths from a path 610 to a pass-through path 614 and to a subsequent path 616. One technique to expand between terminal 606 and 612 is simply to duplicate the optical circuitry between terminals 618 and 620.

Figure 7:
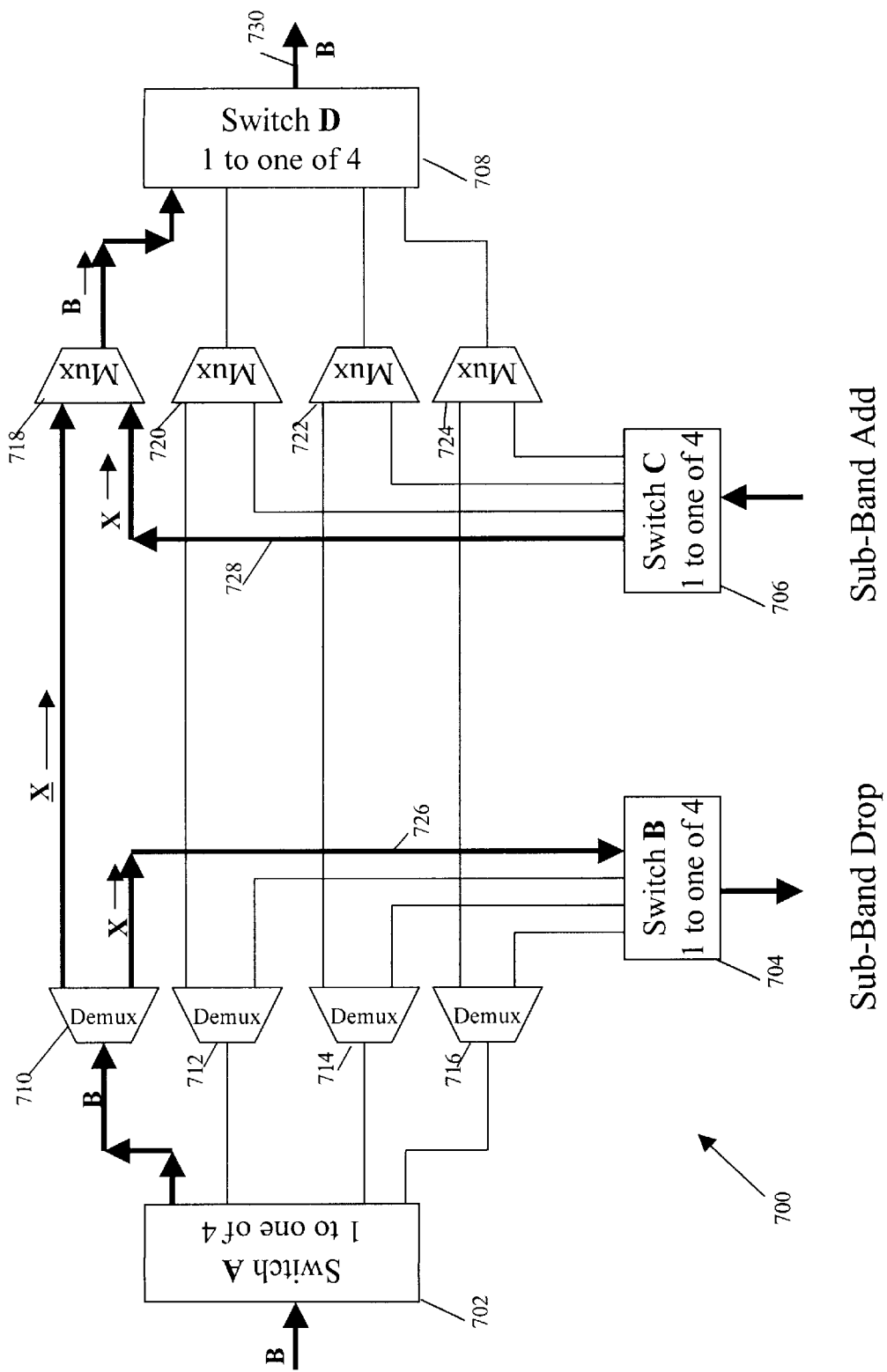
FIG. 7 shows a wide-band OADM, according to another embodiment of the invention.

Another embodiment of the wide-band OADM aspect of the invention is shown in FIG. 7. By controlling of 1×4 switches 702, 704, 706, 708, this apparatus gives the user a choice of accessing any sub-band in the entire wavelength band. Each of de-multiplexers 710, 712, 714, 716, is operative to divide an incoming band of wavelengths into a wavelength sub-band and a wavelength sub-band complement. For example, de-multiplexer 710 divides an incoming wavelength band B into a wavelength sub-band X and its complement $\underline{X}$. The wavelength sub-band X is directed to switch 704, which is configured to accept an input from a waveguide 726. After de-modulating the wavelengths of interest in sub-band X, wavelength sub-band X is directed, through switch 706 and then via waveguide 728, to a multiplexer 718, which multiplexer also receives the wavelength sub-band complement $\underline{X}$, that is passed-through (also called "expressed" herein). The multiplexer 718 outputs the wavelength band B, directing it to switch 708, which subsequently outputs the wavelength band B onto an egress line 730.

The embodiment shown in FIG. 7, for example, may be implemented at a relatively low cost through use of thin film filters for the multiplexer/de-multiplexer pairs. Additional sub-bands can be dropped by adding similar modules in series with that of FIG. 7; however, typically adding additional modules in series results in a disruption in service while a series connection is being made.

Figure 8:
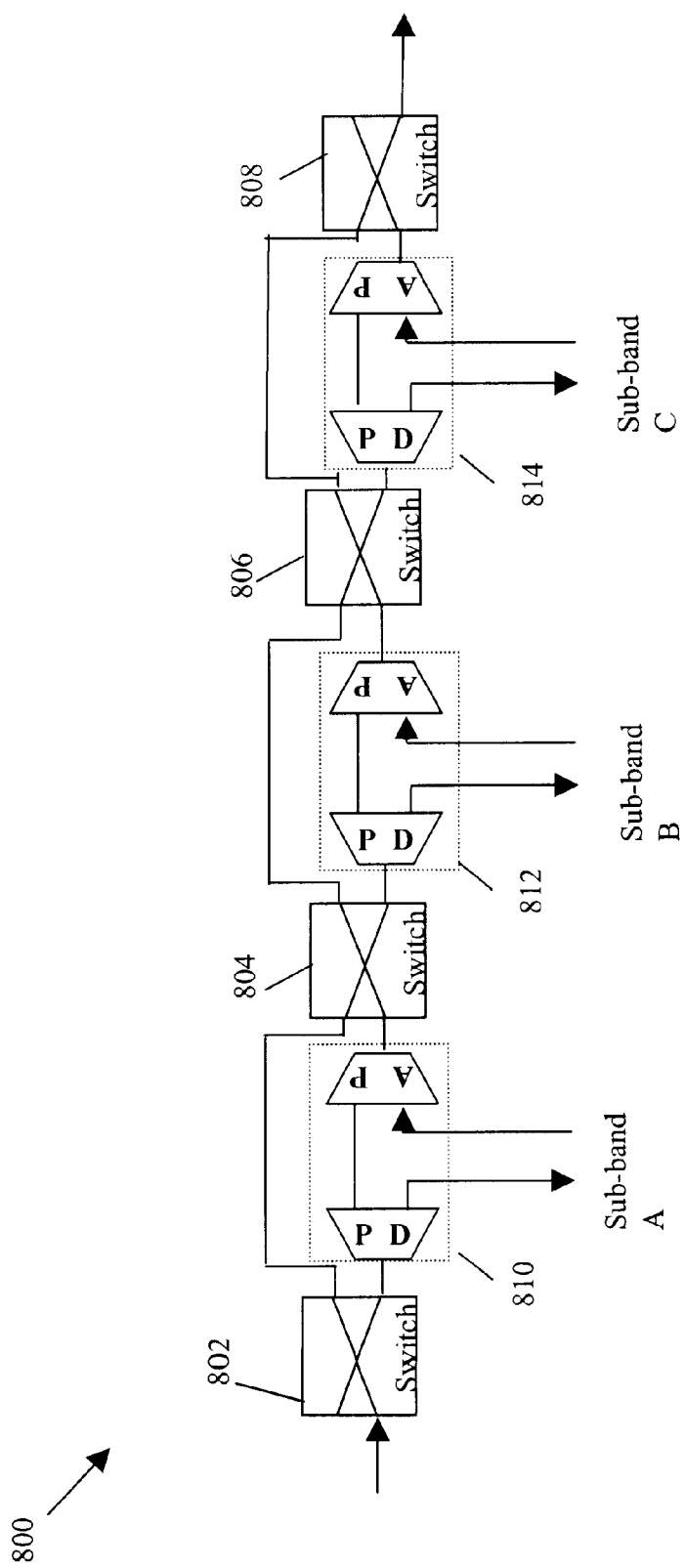
FIG. 8 shows a wide-band OADM, according to an embodiment of the invention.
Figure 9:
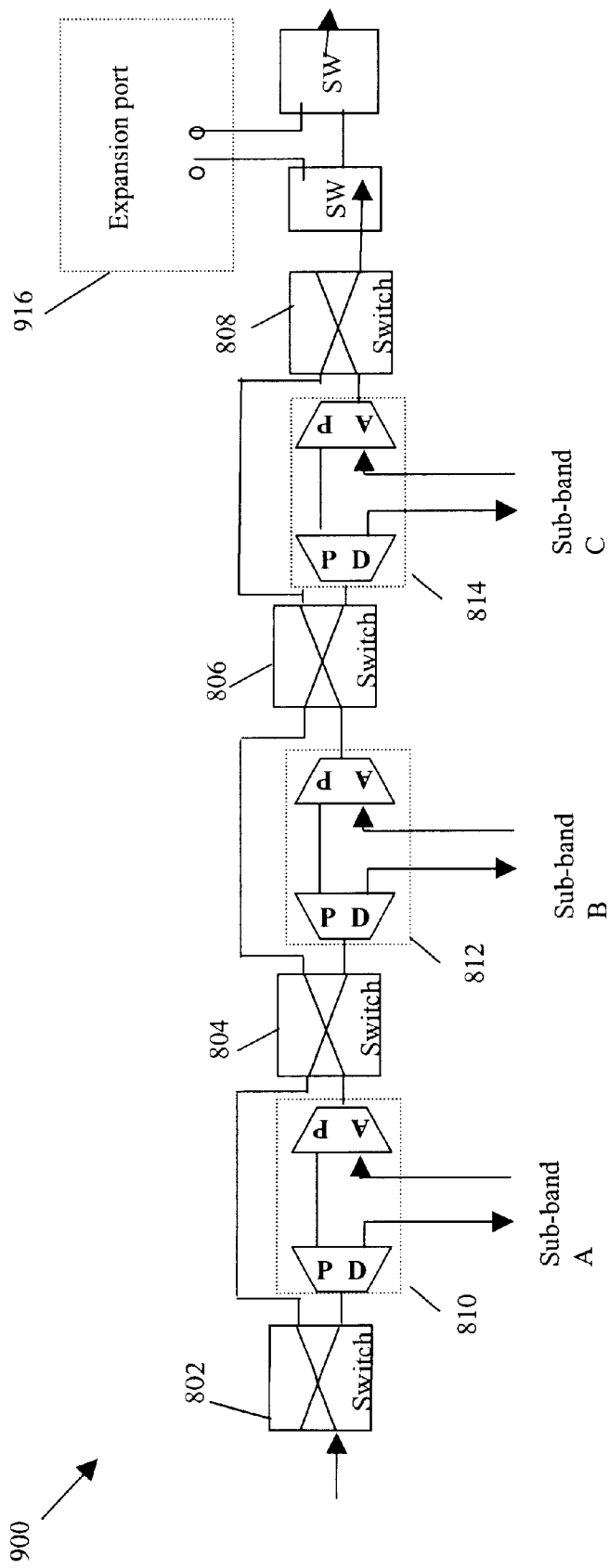
FIG. 9 shows a wide-band OADM with an expansion port, according to an embodiment of the invention.

Another embodiment of the wide-band aspect of the invention is shown in FIG. 8, employing a serial implementation to add/drop a sub-band. Each switch 802, 804, 806 either passes incoming optical wavelengths through, or engages a respective OADM 810, 812, 814, wherein each OADM is tuned to drop and add (also called "drop/add" herein) a specific wavelength sub-band. This embodiment is realizable with current technologies such as thin film filters. The filters can be constructed such that the choice to engage or disengage a particular add/drop filter does not affect any wavelengths operating outside the sub-band that is being dropped. As shown in FIG. 9, an optional expansion port 916 allows for additional OADMs to be added to the embodiment shown in FIG. 8.

Narrow-band OADM embodiments

Figure 10:
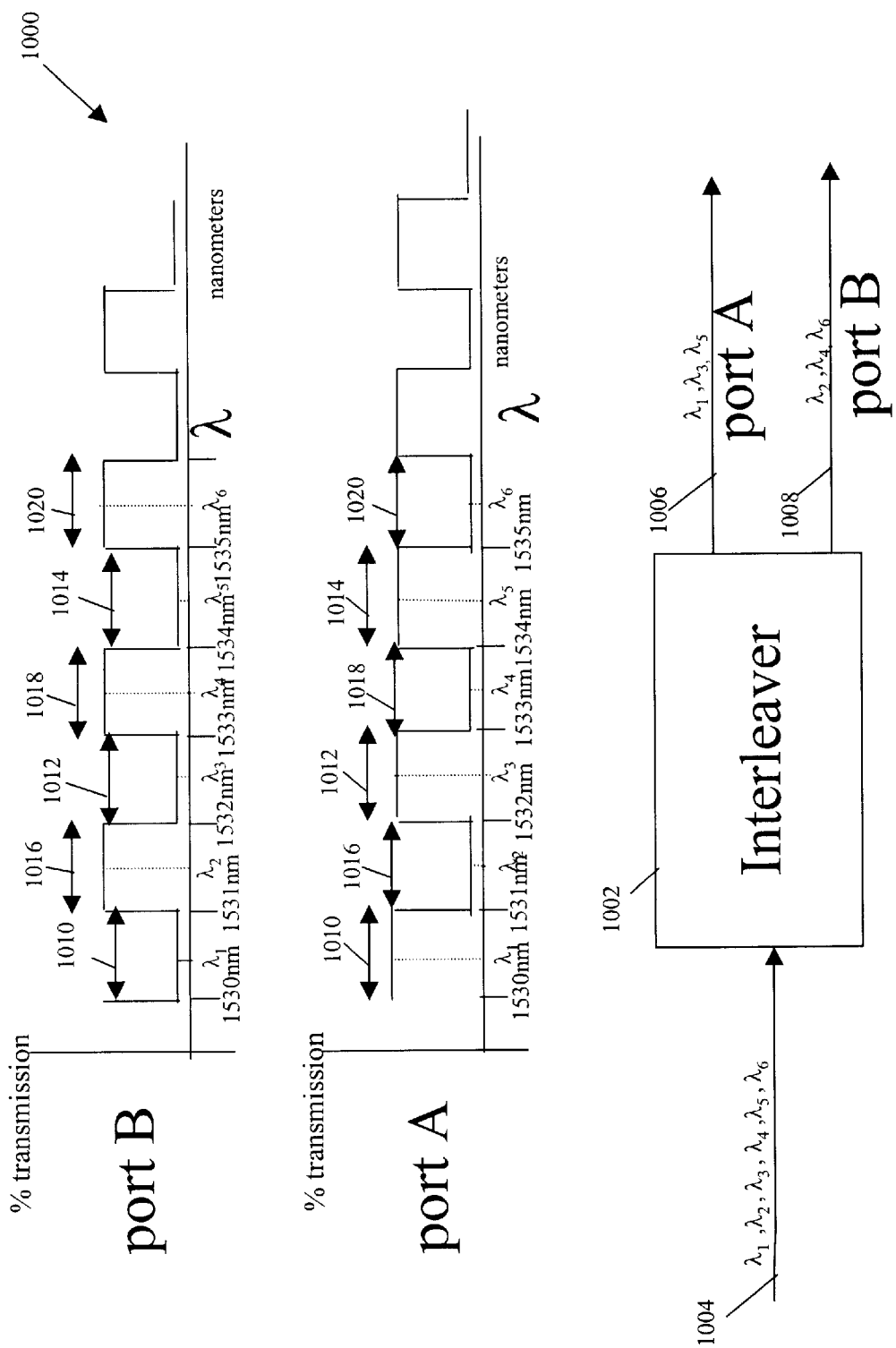
FIG. 10 shows a block diagram of an interleaver that may be used in a narrowband OADM application, according to an embodiment of the invention.

FIG. 10 shows a block diagram of an interleaver that may be used in a narrow-band OADM. A graph of the percentage transmission vs. wavelength indicates that for the narrow-band interleaver 1002 shown, a path internal to the interleaver from the input 1004 to port A 1006 has a high transmissivity for wavelength bands 1010, 1012, 1014, and low transmissivity for wavelength bands 1016, 1018, 1020. Port A transmits wavelengths $\lambda_1\lambda_3\lambda_5$, while effectively blocking wavelengths $\lambda_2\lambda_4\lambda_6$. A path internal to the interleaver from the input 1004 to Port B 1008 has a high transmissivity for wavelength bands 1016, 1018, 1020, and a low transmissivity for wavelength bands 1010, 1012, 1014. Port B effectively blocks wavelengths $\lambda_1\lambda_3\lambda_5$, while transmitting wavelengths $\lambda_2\lambda_4\lambda_6$. A set of wavelengths comprising wavelengths $\lambda_1, \lambda_2, \lambda_3, \lambda_4, \lambda_5, \lambda_6$ that is input into the interleaver 1002 at the input 1004 outputs wavelengths $\lambda_1\lambda_3\lambda_5$ on an output port 1006 and wavelengths $\lambda_2\lambda_4\lambda_6$ on an output port 1008. Numerical values of wavelengths shown on the graphs in nanometers (nm) are for illustrative purposes only, and do not represent a limitation of any kind.

Figure 11:
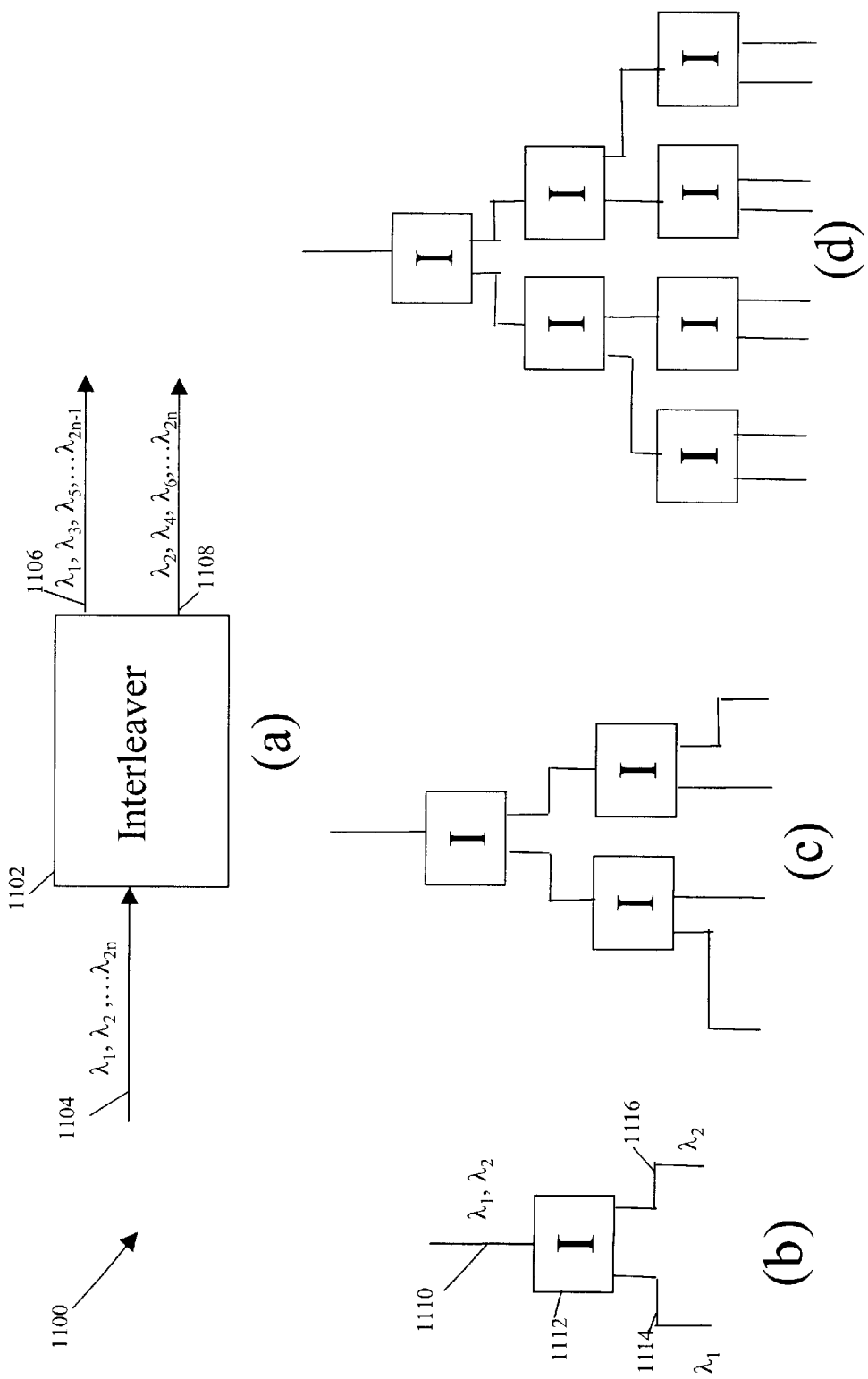
FIGS. 11(a)–(d) show embodiments of a narrow-band OADM, according to the invention.

FIG. 11 shows an embodiment as a narrow-band OADM (also referred to as an interleaver narrow-band OADM herein). FIG. 11 (a) shows a block diagram of an interleaver in operation. The interleaver 1102 receives in an input 1104, a set of wavelengths $\lambda_1, \ldots \lambda_{2n}$, and separates the wavelengths into two groups, providing to a first output 1106 a wavelength subset comprising wavelengths $\lambda_1, \lambda_3, \lambda_5, \ldots \lambda_{2n-1}$, and to a second output a second wavelength subset comprising wavelengths $\lambda_2, \lambda_4, \lambda_6, \ldots \lambda_{2n}$. In FIG. 11(b), an optical signal comprising two optical wavelengths $\lambda_1, X_2$ is input via an input port 1110 into an interleaver 1112; output ports 1114 and 1116 carry output signals, each comprising one wavelength. Cascaded patterns of interleavers, shown in FIGS. 9(c) and (d) enable further separation of multiple wavelengths that comprise a sub-band.

Figure 12:
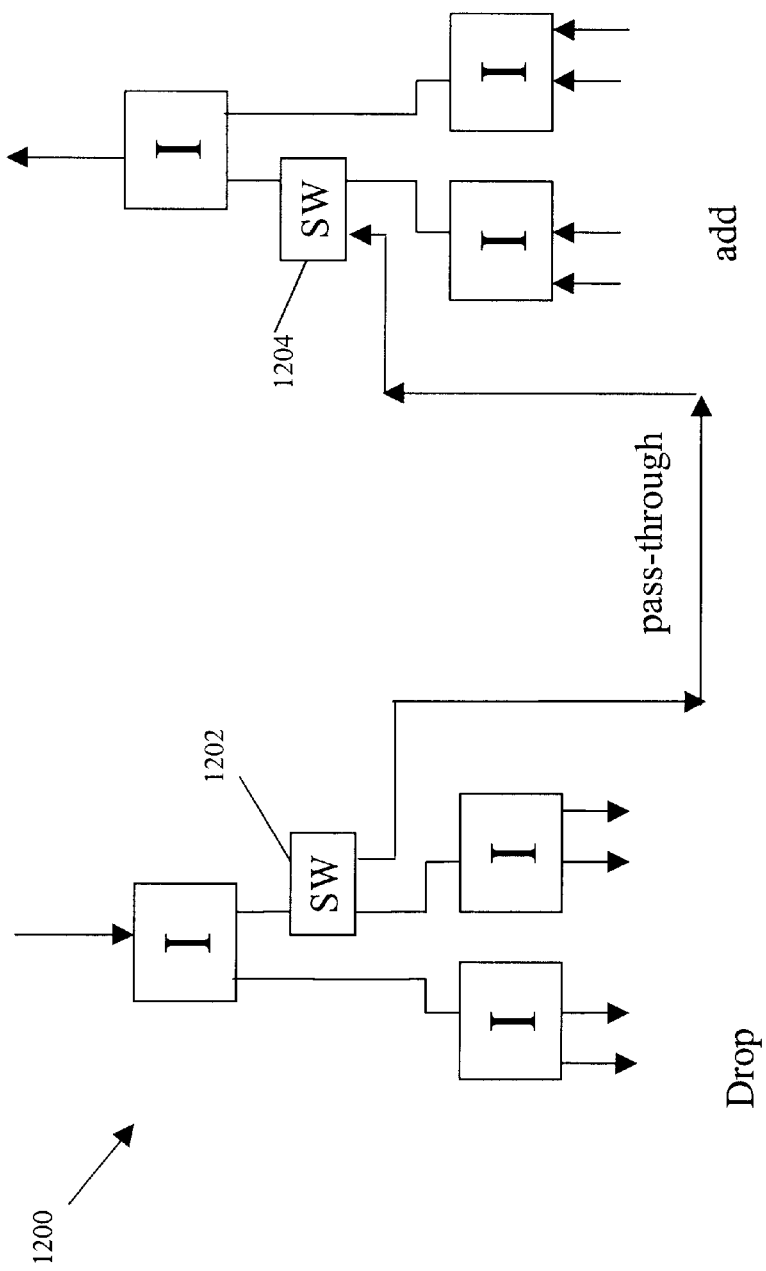
FIG. 12 shows a narrow-band OADM, according to another embodiment of the invention.

The use of interleavers makes it possible to separate out a set of wavelengths onto individual waveguides, independent of the placement of that set of wavelengths in the entire band of operation, because interleavers are based on the principle of the periodicity of the wavelengths contained in the input signal, rather than on a specific wavelength. As interleavers are interchangeable, use of this embodiment reduces inventory problems, i.e., a single type of interleaver can be used in multiple situations. Unused dropped wavelengths from a wide-band OADM may be looped directly back into the wide-band OADM add multiplexer; however they typically suffer signal degradation via channel narrowing due primarily to filtering effects of the narrow-band OADM. In order to avoid signal degradation, switches may be placed at positions as shown in FIG. 12. Switches 1202, 1204 enable looping back of unused dropped wavelengths with minimal signal degradation.

Figure 13:
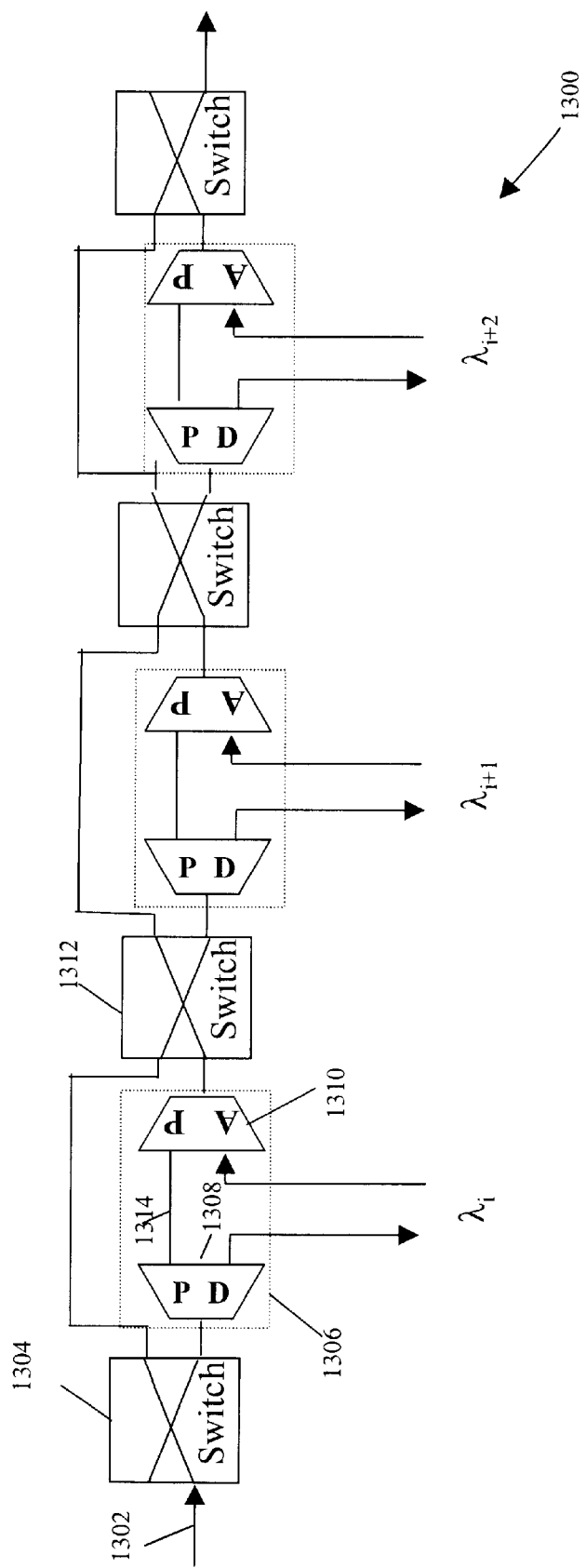
FIG. 13 shows a narrow-band OADM, according to another embodiment of the invention.

Another embodiment of a narrow-band OADM 1300 is shown in FIG. 13. This embodiment utilizes essentially the same configuration as the wide-band embodiment of FIG. 8; however in this case, individual wavelengths are dropped instead of sub-bands. A wavelength sub-band (or wavelength band) is input through an input port 1302. A switch 1304 may be set to bypass an OADM 1306, or to direct the wavelength sub-band to the OADM 1306. Within the OADM 1306 a de-multiplexer 1308 drops a single wavelength $\lambda_i$, passing on the balance of the wavelength sub-band $\lambda_{i+1}, \lambda_{i+2}, \ldots \lambda_j$, i.e., the wavelength sub-band complement, to a multiplexer 1310 via an express path 1314. The wavelength $\lambda_j$, is added to the wavelength sub-band complement in a multiplexer 1310, and the wavelength sub-band proceeds to the next switch 1312. Expansion capabilities may be added in similar fashion to the wide-band embodiment shown in FIG. 9.

Wide-band/narrow-band Combinations

Figure 14:
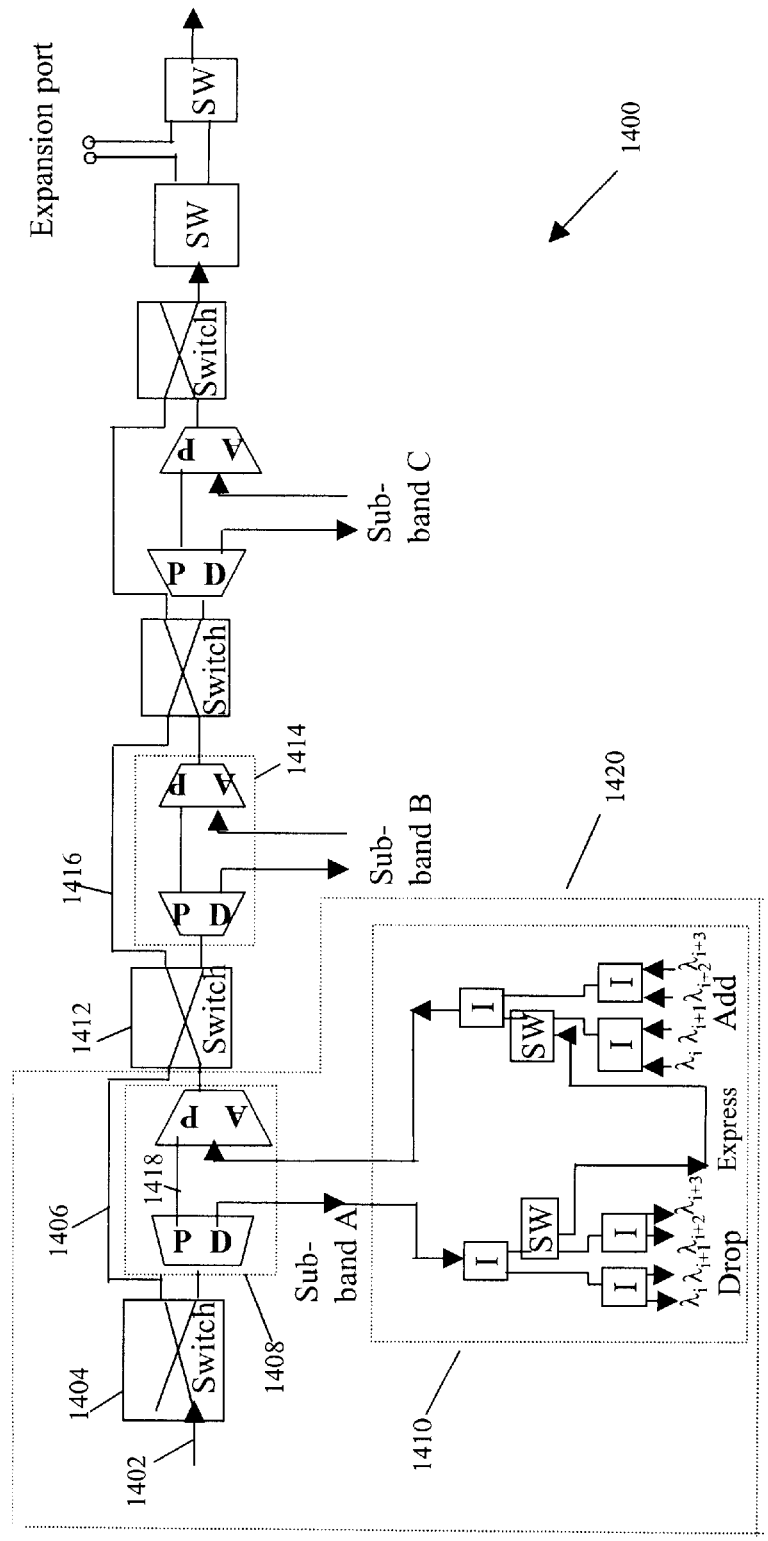
FIG. 14 shows a combination of a wide-band OADM and a narrow-band OADM, according to an embodiment of the invention.

Wide-band OADM implementations may be combined with narrow-band implementations. An embodiment is shown in FIG. 14 that combines a wide-band OADM as in FIG. 9, with a narrow-band OADM as in FIG. 12. An optical signal comprising a band of wavelengths is input at input port 1402. A switch 1404 directs the optical signal to an express path 1406, or to a wide-band OADM 1408. The wide-band OADM 1408 drops a sub-band A of wavelengths to a narrow-band OADM 1410. The narrow-band OADM 1410 drops individual wavelengths $\lambda_i, \lambda_{i+1}, \lambda_{i+2}, \lambda_{i+3}$ while expressing wavelengths that are not to be dropped, and subsequently adds the dropped wavelengths to re-form the sub-band. The sub-band is then directed back to the wide-band OADM 1408, where it is multiplexed with the sub-band complement that has been expressed via a path 1418, producing the band of wavelengths, which is then output to a switch 1412. The band of wavelengths is then directed via the switch 1412, as set by a user, to one of a pass-through path 1416, or to a next wide-band OADM 1414. The embodiment of FIG. 14 has the advantage of reduction in inventory, since through the use of a single type of module 1420, both the wideband and narrow-band OADMs can be constructed to be universal, i.e. capable of handling any wavelength grouping within the entire operating band.

Figure 15:
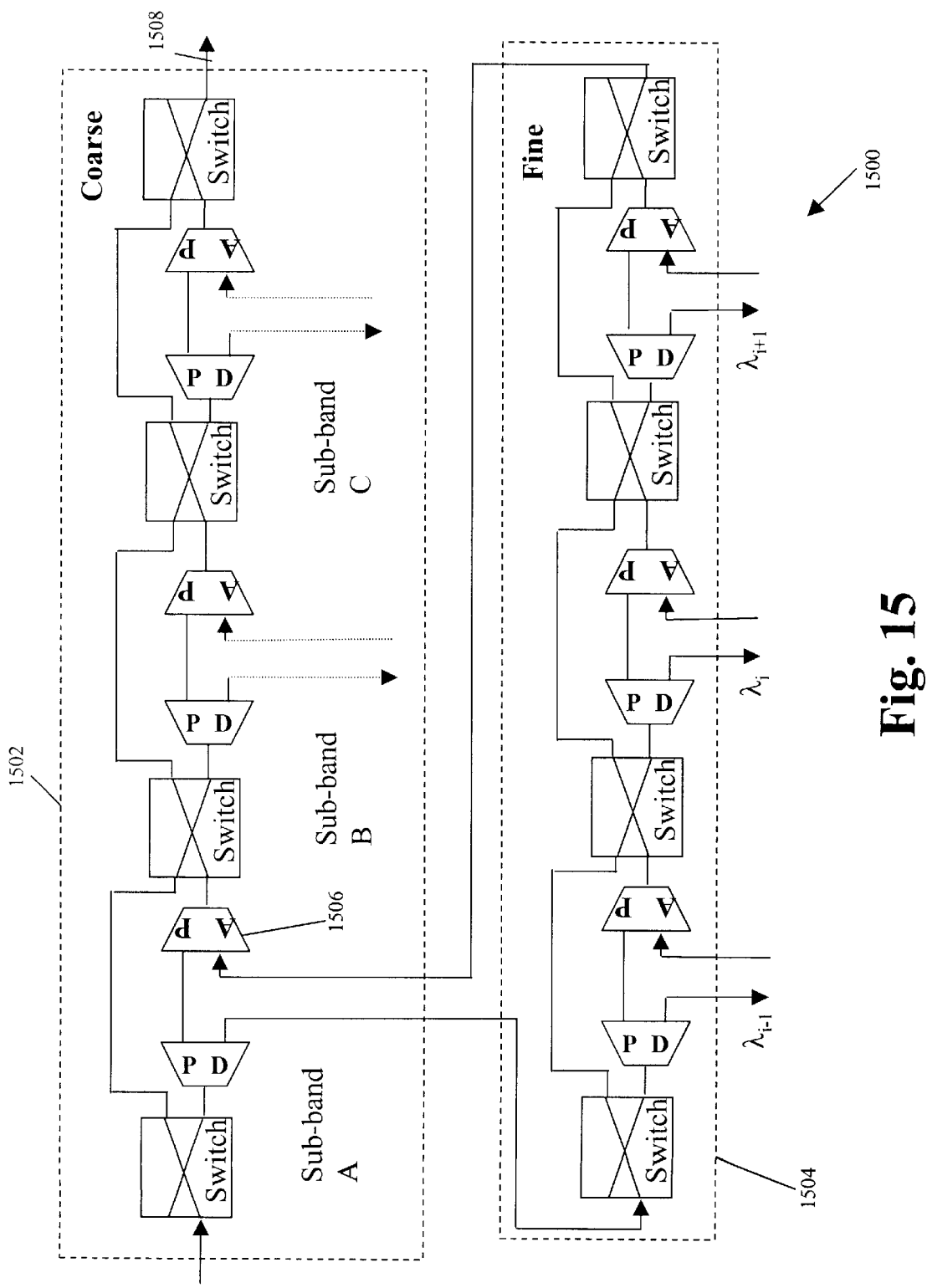
FIG. 15 shows a combination of a wide-band OADM and a narrow-band OADM, according to another embodiment of the invention.

FIG. 15 shows an embodiment of the invention employing a wide-band OADM as in FIG. 8 and a narrow-band OADM as in FIG. 13. A wide-band module 1502 drops sub-bands A, B, C, to respective narrow-band modules. A narrow-band module 1504 receives sub-band A. Narrow-band module 1504 inputs sub-band A and drops individual wavelengths $\lambda_{i-1}, \lambda_i, \lambda_{i+1}$. In the narrow-band module 1504, the dropped wavelengths are added back to the complement of sub-band A to form the sub-band A, which is then added back to the sub-band complement in a multiplexer 1506 within the wide-band module 1502 to form the initially input wavelength band, which is then output through output 1508.

Having illustrated and described the principles of the invention in the above-described embodiments, it should be apparent to those skilled in the art that the embodiments can be modified in arrangement and detail without departing from such principles. In view of the many possible embodiments to which the presented may be applied, it should be recognized that the illustrated embodiments are only examples of the invention and should not be taken as a limitation on the scope of the invention. Rather, the invention is defined by the following claims. It is therefore claimed as the invention all such embodiments that come within the scope and spirit of these claims.

What is claimed is:

1. An apparatus comprising:
   a wide-band Optical Add/Drop Multiplexer (OADM) to drop and then add a wavelength sub-band of a wavelength band input to the wide-band OADM, and to output the wavelength band; and
   a narrow-band OADM coupled to receive the wavelength sub-band from the wide-band OADM, further to drop and then add at least one wavelength of the wavelength sub-band, and to output a wavelength sub-band to the wide-band OADM.

* * * * *